United States Patent
Kadalbal et al.

(10) Patent No.: US 12,262,312 B2
(45) Date of Patent: Mar. 25, 2025

(54) UNIFIED DATA REPOSITORY (UDR) ACCESS ACROSS WIRELESS COMMUNICATION NETWORKS

(71) Applicant: T-MOBILE INNOVATIONS LLC, Overland Park, KS (US)

(72) Inventors: Sriharsha Nagaraja Kadalbal, Sammamish, WA (US); Anuj Sharma, Broadlands, VA (US); Deepesh Belwal, Ashburn, VA (US); Anil Kumar Mariyani, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/524,471

(22) Filed: Nov. 30, 2023

(65) Prior Publication Data
US 2024/0107437 A1 Mar. 28, 2024

Related U.S. Application Data

(63) Continuation of application No. 17/508,042, filed on Oct. 22, 2021, now Pat. No. 11,864,099.

(51) Int. Cl.
*H04W 48/18* (2009.01)
*H04M 15/00* (2024.01)
(Continued)

(52) U.S. Cl.
CPC ........... *H04W 48/18* (2013.01); *H04M 15/66* (2013.01); *H04W 48/16* (2013.01); *H04W 84/042* (2013.01)

(58) Field of Classification Search
CPC ... H04W 48/18; H04W 48/16; H04W 84/042; H04M 15/66
See application file for complete search history.

(56) References Cited

U.S. PATENT DOCUMENTS

| | | | |
|---|---|---|---|
| 7,860,167 | B2 | 12/2010 | Le Dinh et al. |
| 10,524,166 | B2 | 12/2019 | Youn et al. |

(Continued)

FOREIGN PATENT DOCUMENTS

| | | |
|---|---|---|
| EP | 3863272 A1 | 8/2021 |
| EP | 4087215 A1 | 11/2022 |
| WO | 2021141440 A1 | 7/2021 |

OTHER PUBLICATIONS

"3rd Generation Partnership Project; Technical Specification Group Services and System Aspects; Procedures for the 5G System (5GS); Stage 2, (Release 17)"; Sep. 2021; pp. 1-712; TS 23.502 V17.2.1; 3GPP; Sophia Antipolis, France.

(Continued)

*Primary Examiner* — Diane D Mizrahi

(57) ABSTRACT

A wireless communication system serves a wireless User Equipment (UE) over a wireless network slice. A serving wireless communication network selects a Uniform Data Repository (UDR) in a target wireless communication network based on the wireless network slice. The serving wireless communication network transfers an information request for the wireless UE across a wireless communication network boundary to the selected UDR in the target wireless communication network. In response to the information request, the selected UDR in the target wireless communication network transfers UE information for the wireless UE across the wireless communication network boundary to the serving wireless communication network. The wireless network slice in the serving wireless communication network serves the wireless UE based on the UE information.

20 Claims, 9 Drawing Sheets

(51) Int. Cl.
*H04W 48/16* (2009.01)
*H04W 84/04* (2009.01)

(56) References Cited

U.S. PATENT DOCUMENTS

| | | |
|---|---|---|
| 10,531,420 B2 | 1/2020 | Li et al. |
| 10,652,098 B2 | 5/2020 | Kim |
| 10,742,396 B2 | 8/2020 | Suthar et al. |
| 10,764,789 B2 | 9/2020 | Qiao et al. |
| 10,791,508 B2 | 9/2020 | Park et al. |
| 10,999,787 B2 | 5/2021 | Dao et al. |
| 11,576,056 B1 | 2/2023 | Sharma et al. |
| 11,864,099 B2 * | 1/2024 | Kadalbal ............... H04W 48/18 |
| 2019/0053147 A1 | 2/2019 | Qiao et al. |
| 2021/0099905 A1 | 4/2021 | Huang et al. |
| 2022/0346188 A1 | 10/2022 | Malhotra |

OTHER PUBLICATIONS

"3rd Generation Partnership Project; Technical Specification Group Services and System Aspects; System architecture for the 5G System (5GS); Stage 2, (Release 16)"; Sep. 2021; pp. 1-453; TS 23.501 V16.10.0; 3GPP; Sophia Antipolis, France.

* cited by examiner

UNIFIED DATA REPOSITORY (UDR) ACCESS ACROSS WIRELESS COMMUNICATION NETWORKS

RELATED CASES

This United States Patent Application is a continuation of U.S. patent application Ser. No. 17/508,042 that was filed on Oct. 22, 2021 and is entitled "UNIFIED DATA REPOSITORY (UDR) ACCESS ACROSS WIRELESS COMMUNICATION NETWORKS." U.S. patent application Ser. No. 17/508,042 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network. In another example, a vehicle may execute a navigation application that communicates with a direction server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together in network data centers. Some of the network elements like User Plane Functions (UPFs) are grouped into wireless network slices that deliver data services like massive Machine Type Communications (mMTC), Ultra-Reliable Low-Latency Communications (URLLC), enhanced Mobile Broadband (eMBB), Mobile Virtual Network Operator (MVNO), private network, mobile internet-access, and/or some other networking product. The wireless network elements comprise Unified Data Repositories (UDRs), Unified Data Management (UDM), Access and Mobility Management Functions (AMFs), and the like.

The wireless user devices and the AMFs communicate over the wireless access nodes. The AMFs and the UDMs authenticate the wireless user devices and identify subscriber information like wireless network slices. The AMFs and Policy Control Functions (PCFs) identify subscriber policies like roaming rules and service quality. The UDMs and PCFs store the subscriber information and policies in the UDRs. The UDRs also store data for the Network Exposure Functions (NEFs) which expose network data like UE location to network elements like PCFs and Application Functions (AFs). For example, an AF may transfer packet flow instruction for a wireless user device to a NEF for delivery to a PCF which implements the instruction. Thus, the UDRs store and serve data for the UDMs, PCFs, and NEFs.

A UDR is typically located in a Public Land Mobile Network (PLMN). The UDR serves the UDMs, PCFs, and NEFs that are in its PLMN. The PLMN may have multiple UDRs that can be requestor-specific and that handle different user-groups. For example, a PCF would access a UDR that stores policies, and a NEF would access another UDR that stores exposure data. To discover the proper UDR in the PLMN, the network element (UDM, PCF, NEF) asks a Network Repository Function (NRF). The NRF selects the UDR based on the requesting network element—like selecting a policy UDR for a PCF. The UDRs may be further separated by user groups, and the NRF may select a UDR based on the wireless user device identifier and its corresponding user group. The user groups may comprise ranges of Subscriber Permanent Identifiers (SUPIs).

Service Communication Proxies (SCPs) route requests between the network elements. A PCF may transfer a UDR request to an SCP, and the SCP routes the UDR request to the proper policy UDR based on the PCF request, SUPI range, and the like. The SCPs may handle the UDR responses or they may be direct. The network elements may be configured to use specific SCPs or may discover them from the NRFs.

The amount of wireless network users and the variety of wireless network slices is expanding rapidly across the PLMNs. Unfortunately, the UDRs are inefficiently organized based on PLMN and simple data categories like subscriber, policy, application, and exposure. Moreover, the SCPs do not have effective access to a larger array of UDRs across the PLMNs to efficiently serve the growing number of wireless user devices and wireless network slices.

Technical Overview

In some examples, a wireless communication system serves a wireless User Equipment (UE) over a wireless network slice. The wireless communication system comprises a serving wireless communication network and a target wireless communication network. The serving wireless communication network selects a Uniform Data Repository (UDR) in the target wireless communication network based on the wireless network slice. The serving wireless communication network transfers an information request for the wireless UE across a wireless communication network boundary to the selected UDR in the target wireless communication network. The selected UDR in the target wireless communication network receives the information request for the wireless UE across the wireless communication network boundary from the serving wireless communication network. In response to the information request, the selected UDR in the target wireless communication network transfers UE information for the wireless UE across the wireless communication network boundary to the serving wireless communication network. The serving wireless communication network receives the UE information for the wireless UE across the wireless communication network boundary from the target wireless communication network. The wireless network slice in the serving wireless communication network serves the wireless UE based on the UE information.

In some examples, a Service Communication Proxy (SCP) in a serving Public Land Mobile Network (PLMN) selects a UDR in a target PLMN. The SCP transfers an information request for the wireless UE to the selected UDR in the target PLMN. The selected UDR in the target PLMN receives the information request for the wireless UE from the SCP in the serving PLMN. In response to the information request, the selected UDR transfers UE information for the wireless UE to the serving PLMN. The wireless network slice in the serving PLMN serves the wireless UE based on the UE information from the selected UDR in the target PLMN.

DETAILED DESCRIPTION

Figure 1:
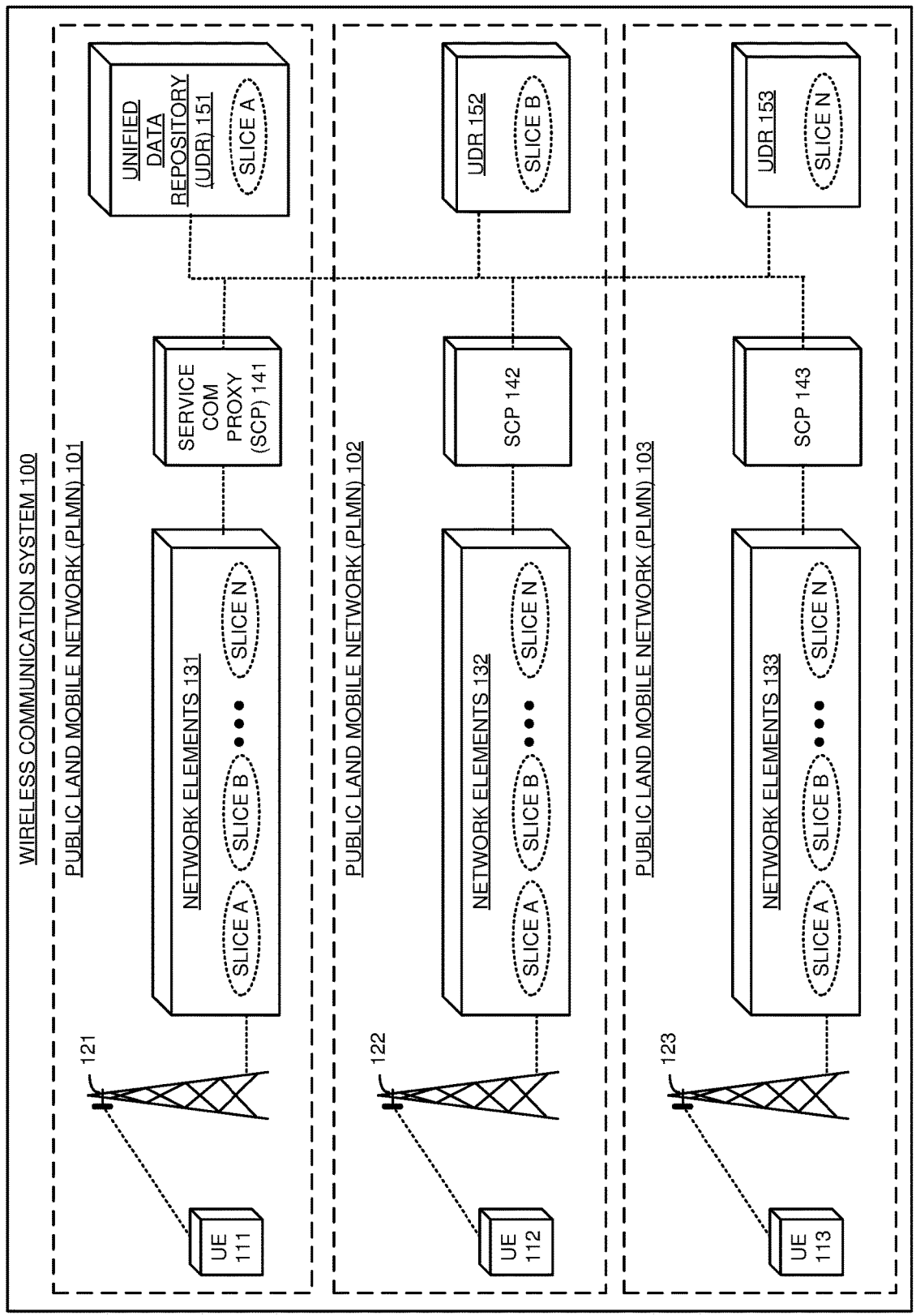
FIG. 1 illustrates an exemplary wireless communication system that comprises multiple Public Land Mobile Networks (PLMNs) that use Uniform Data Repositories (UDRs) to serve wireless User Equipment (UEs) over wireless network slices.

FIG. 1 illustrates exemplary wireless communication system 100 that comprises Public Land Mobile Networks (PLMNs) 101-103 that use Uniform Data Repositories (UDRs) 151-153 to serve wireless User Equipment (UEs) 111-113 over wireless network slices A-N. Wireless network slices A-N comprise massive Machine Type Communications (mMTC) slices, Ultra-Reliable Low-Latency Communication (URLLC) slices, enhanced Mobile Broadband (eMBB) slices, Mobile Virtual Network Operator (MVNO) slices, private network slices, mobile internet-access slices, and/or some other network service. PLMN 101 comprises UE 111, wireless access node 121, network elements 131, Service Communication Proxy (SCP) 141, and UDR 151. PLMN 102 comprises UE 112, wireless access node 122, network elements 132, SCP 142, and UDR 152. PLMN 103 comprises UE 113, wireless access node 123, network elements 133, SCP 143, and UDR 153. Network elements 131-133 serve wireless network slices A-N to UEs 111-113 over wireless access nodes 121-123. UDRs 151-153 store UE information for respective and representative wireless network slices A-N. UEs 111-113 comprise computers, phones, vehicles, sensors, robots, or some other data appliance with communication circuitry. Network elements 131 comprise User-Plane Functions (UPFs), Policy Control Functions (PCFs), Network Exposure Functions (NEFs), and/or some other network elements. Wireless communication system 100 is simplified for clarity and typically includes far more PLMNs, UEs, access nodes, SCPs, and UDRs.

Various examples of network configuration and operation are described herein. In some examples, network elements 131 in PLMN 101 serve wireless network slice B to UE 111 over wireless access node 121. In response, one of network elements 131 determines a UE Identifier (ID) for wireless UE 111 and a slice ID for wireless network slice B. This requesting one of network elements 131 transfers a request that indicates the UE ID and the slice ID to SCP 141 in serving PLMN 101. SCP 141 in serving PLMN 101 receives the request, and in response, SCP 141 selects UDR 152 in PLMN 102 based on the UE ID for UE 111 and the slice ID for slice B. For example, SCPs 141-143 may each host their own data structure that correlates all available UE-slice pairs in wireless communication system 100 with individual UDRs 151-153 across all PLMNs 101-103. SCP 141 transfers the request to selected UDR 152 in PLMN 102. UDR 152 in PLMN 102 receives the request from SCP 141 and responsively transfers UE information for wireless UE 111 for delivery to the requesting one of network elements 131 in serving PLMN 101. This transfer of the UE information from UDR 152 to the requesting one of network elements 131 may be direct or traverse SCP 141. The requesting one of network elements 131 receives the UE information transferred by UDR 152 and controls wireless network slice B for wireless UE 111 based on the UE information. For example, a UDM in network elements 131 may authenticate UE 111 based on the UE information for slice B from UDR 152. A PCF in network elements 131 may select a quality-of-service for UE 111 based on the UE information for slice B from UDR 152. A NEF in network elements 131 may control a packet flow for UE 111 based on the UE information for slice B from UDR 152. Advantageously, UDRs 151-153 are efficiently organized based on wireless network slice and UE ID. Moreover, SCPs 141-142 have effective access to a larger array of UDRs across PLMNs 101-103 to efficiently serve the growing number of UEs and slices.

Additional factors may be used to deploy UDRs 151-153—especially assuming that the number of UDRs is likely far higher than shown. In a large deployment, the data for a given UE and slice should be stored redundantly with one copy stored near the likely requestors to reduce latency. The data for groups of UEs and slices should be stored together so individual UDRs support ranges of SUPIs. Regional and national UDR clusters may be established where both regional and national UDR clusters maintain redundant copies of the UDR data. Within a region, the UDRs may maintain redundant copies of the UDR data to further bolster secure data access. Thus, the national UFR cluster backs-up the regional UDR clusters which also back-up each other. All of the SCPs and the UDRs across all regional and national clusters should be coupled over a fault-tolerant SCP/UDR communication network like optical rings.

UEs 111-113 and wireless access nodes 121-123 communicate over wireless links that use wireless technologies like Fifth Generation New Radio (5GNR), Long Term Evolution (LTE), Institute of Electrical and Electronic Engineers (IEEE) 802.11 (WIFI), Low-Power Wide Area Network (LP-WAN), Bluetooth, and/or some other wireless communication protocols. The components of wireless communication system 100 communicate over network connections that comprise metallic wiring, glass fibers, radio channels, or some other communication media. The network connections use technologies like IEEE 802.3 (ETHERNET), Internet Protocol (IP), Time Division Multiplex (TDM), Data Over Cable System Interface Specification (DOCSIS), General Packet Radio Service Transfer Protocol (GTP), 5GNR, LTE, WIFI, LP-WAN, Bluetooth, virtual switching, inter-processor communication, bus interfaces, and/or some other data communication protocols. UEs 111-113 and wireless access nodes 121-123 comprise radios. UEs 111-113, wireless access nodes 121-123, network elements 131-133, SCPs 141-143, and UDRs 151-153 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication system 100 as described herein.

Figure 2:
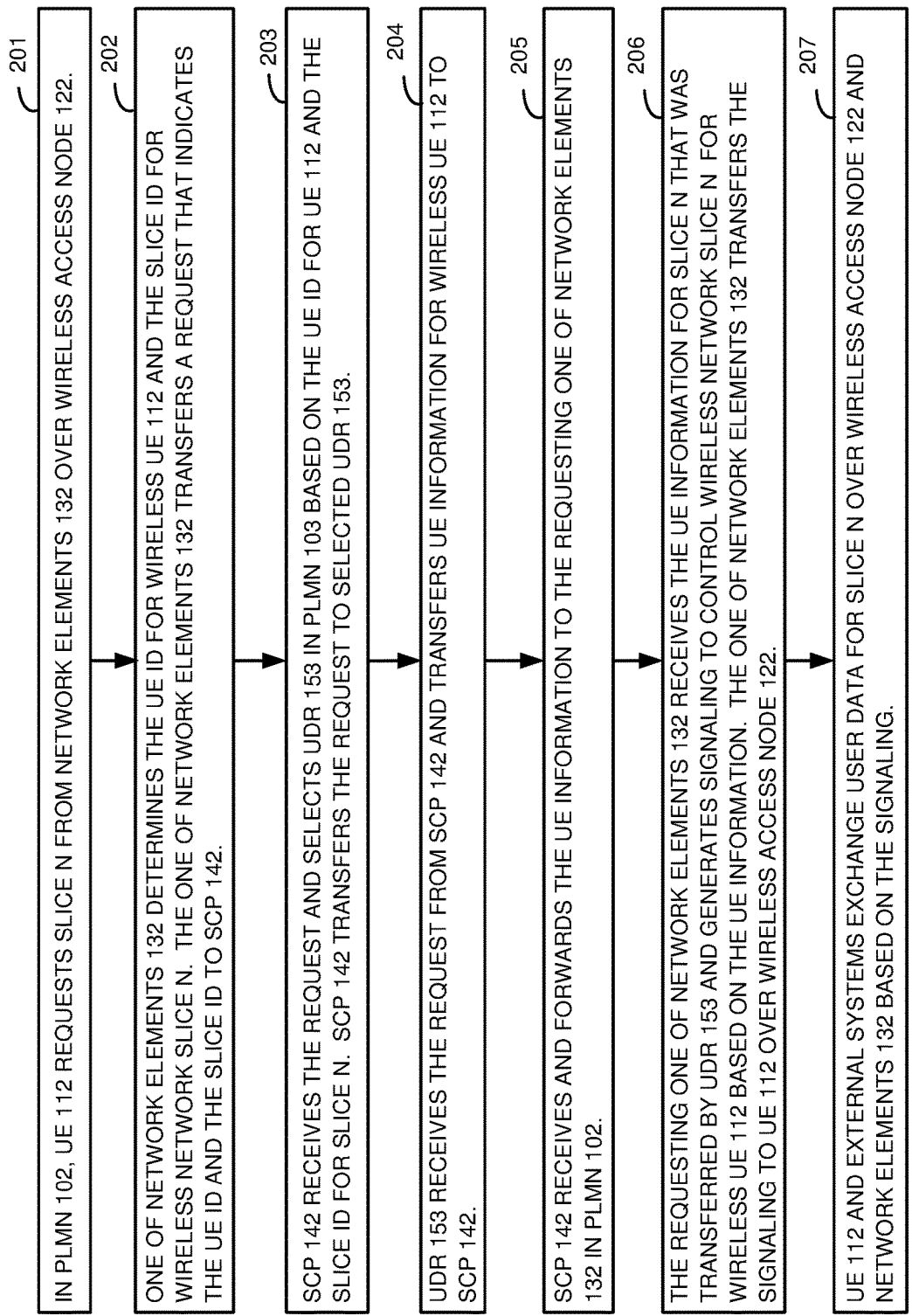
FIG. 2 illustrates an exemplary operation of the wireless communication system that comprises the multiple PLMNs that use the UDRs to serve the wireless UEs over the wireless network slices.

FIG. 2 illustrates an exemplary operation of wireless communication system 100 that comprises PLMNs 101-103 that use UDRs 151-153 to serve wireless UEs 111-113 over the wireless network slices A-N. The operation may vary in other examples. In PLMN 102, UE 112 requests slice N from network elements 132 over wireless access node 122 (201). At least one of network elements 132 determines the UE ID for wireless UE 112 and the slice ID for requested wireless network slice N (202). The one of network elements 132 transfers a request that indicates the UE ID and the slice ID to SCP 142 (202). SCP 142 receives the request and selects UDR 153 in PLMN 103 based on the UE ID for UE 112 and the slice ID for slice N (203). SCP 142 transfers the request to selected UDR 153 (203). UDR 153 receives the request from SCP 142 and transfers UE information for wireless UE 112 to SCP 142 (204). SCP 142 receives the UE information from UDR 153 and forwards the UE information to the requesting one of network elements 132 in PLMN 102 (205). The requesting one of network elements 132 receives the UE information for slice N that was transferred by UDR 153 and generates signaling to control wireless network slice N for wireless UE 112 based on the UE information (206). Network elements 132 transfer the signaling to UE 112 over wireless access node 122 (206). UE 112 and external systems exchange user data for slice N over wireless access node 122 and network elements 132 based on the signaling (207).

Figure 3:
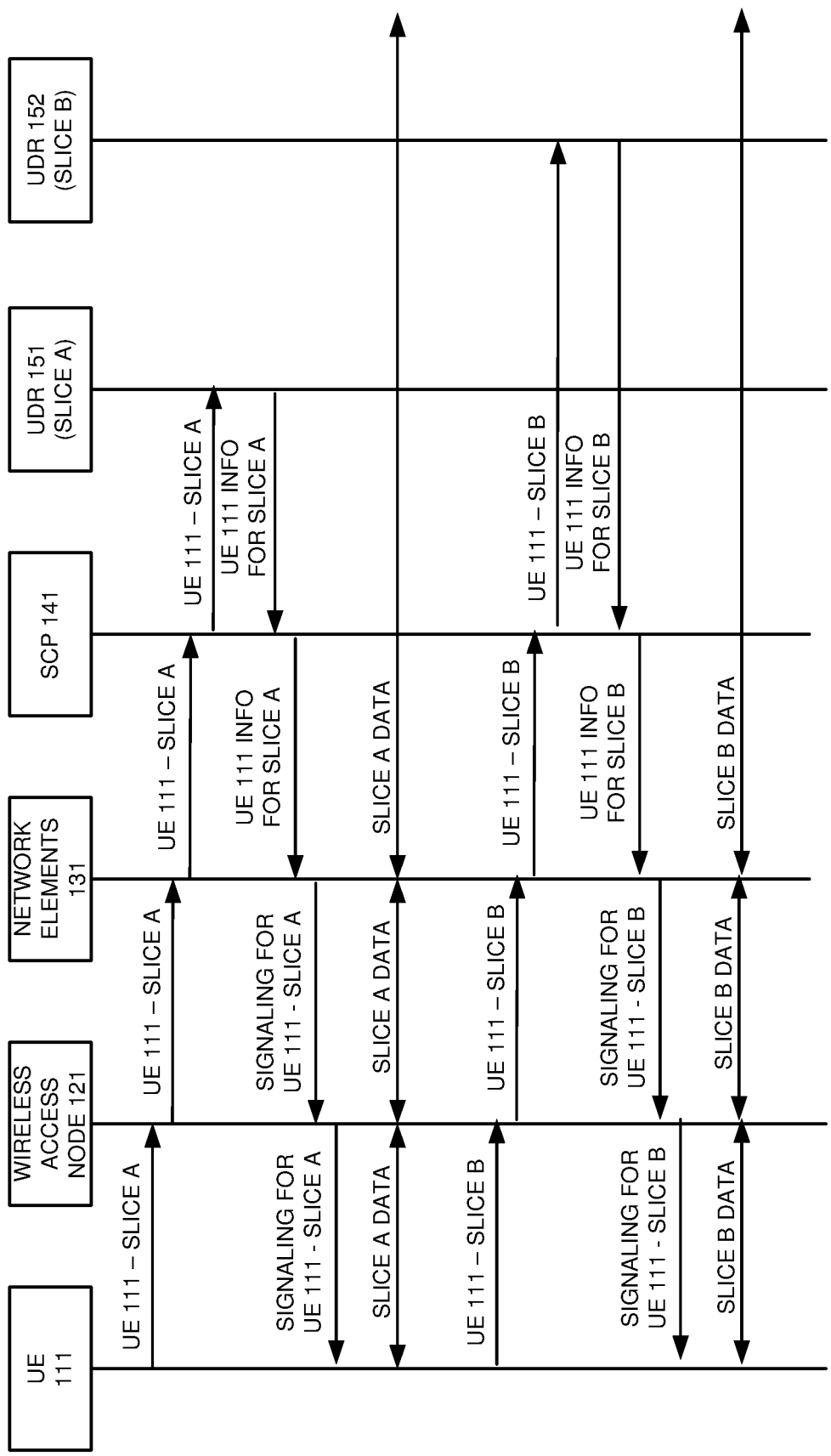
FIG. 3 illustrates an exemplary operation of the wireless communication system that comprises the multiple PLMNs that use the UDRs to serve the wireless UEs over the wireless network slices.

FIG. 3 illustrates an exemplary operation of wireless communication system 100 that comprises PLMNs 101-103 that use UDRs 151-153 to serve wireless UEs 111-113 over wireless network slices A-N. The operation may vary in other examples. UE 111 requests slice A from network elements 131 over wireless access node 121. In response, network elements 131 determine a UE ID for wireless UE 111 and a slice ID for wireless network slice A. Network elements 131 transfer requests that indicate the UE ID and the slice ID to SCP 141. SCP 141 receives the requests, and in response, selects UDR 151 based on the UE ID for UE 111 and the slice ID for slice A. SCP 141 transfers the requests to selected UDR 151 in PLMN 101. UDR 151 receives the request from SCP 141 and responsively transfers UE information for wireless UE 111 to SCP 141 which forwards the UE information to the network elements 131 in PLMN 101. Network elements 131 receive the UE information for slice A that was transferred by UDR 151 and generates signaling to control wireless network slice A for wireless UE 111 based on the UE information. Network elements 131 transfer the signaling to UE 111 over wireless access node 121. UE 111 and external systems exchange user data for slice A over wireless access node 121 and network elements 131 based on the signaling.

UE 111 then requests slice B from network elements 131 over wireless access node 121. In response, network elements 131 determine the UE ID for wireless UE 111 and a slice ID for wireless network slice B. Network elements 131 transfer requests that indicate the UE ID and the slice ID to SCP 141. SCP 141 receives the requests, and in response, selects UDR 152 based on the UE ID for UE 111 and the slice ID for slice B. SCP 141 transfers the requests to selected UDR 152 in PLMN 102. UDR 152 receives the request from SCP 141 and responsively transfers UE information for wireless UE 111 to SCP 141 which forwards the UE information to the network elements 131 in PLMN 101. Network elements 131 receive the UE information for slice B that was transferred by UDR 152 and generates signaling to control wireless network slice B for wireless UE 111 based on the UE information. Network elements 131 transfer the signaling to UE 111 over wireless access node 121. UE 111 and external systems exchange user data for slice B over wireless access node 121 and network elements 131 based on the signaling.

Figure 4:
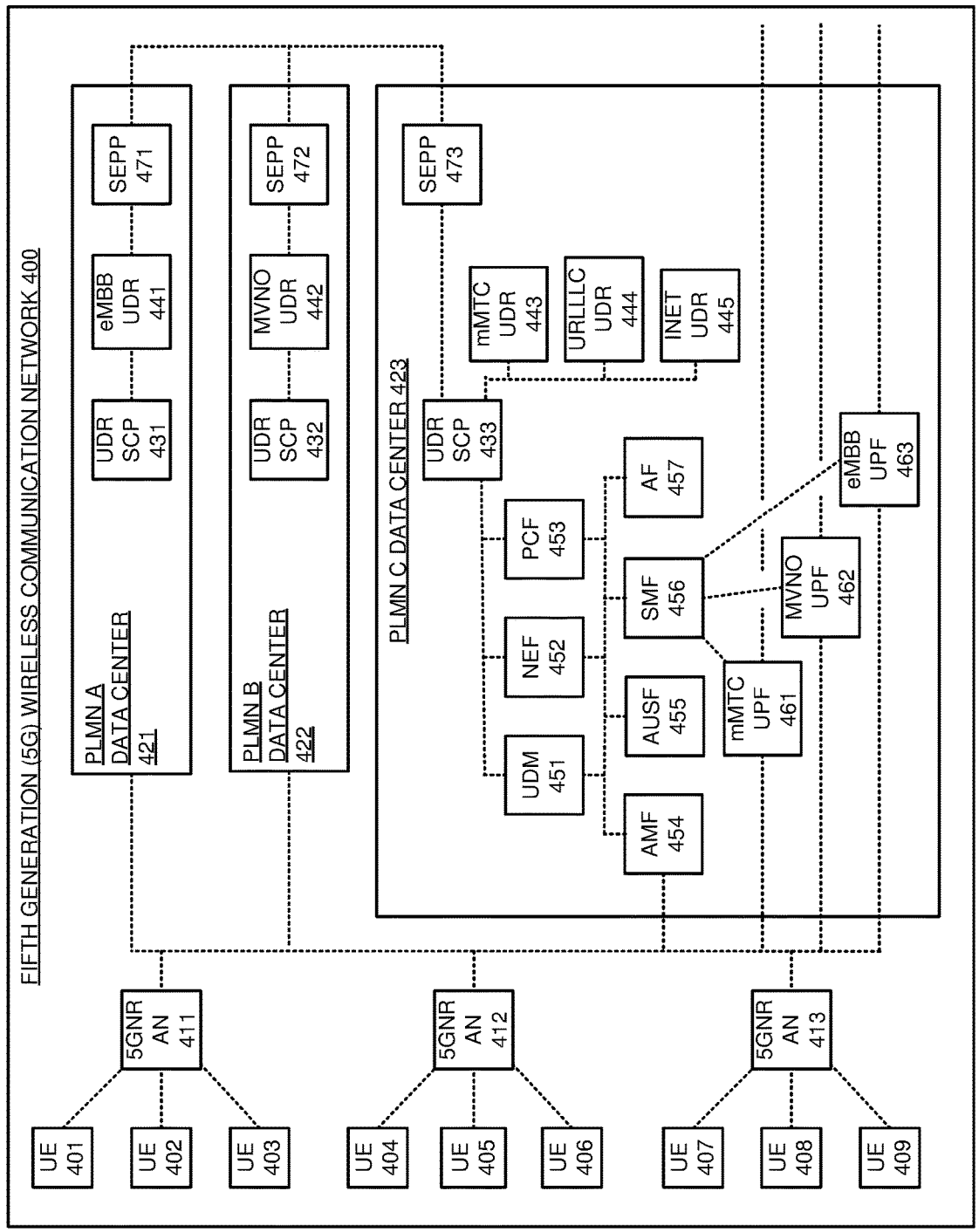
FIG. 4 illustrates an exemplary Fifth Generation (5G) wireless communication system that comprises multiple PLMNs that use UDRs to serve wireless UEs over wireless network slices.

FIG. 4 illustrates exemplary Fifth Generation (5G) wireless communication system 400 that comprises PLMNs A, B, and C that use UDRs 441-445 to serve wireless UEs 401-409 over wireless network slices. 5G wireless communication system 400 comprises an example of wireless communication system 100, although system 100 may differ. 5G wireless communication system 400 comprises: UEs 401-409, 5GNR Access Nodes (ANs) 411-413, and PLMN data centers 421-423. PLMN C data center 423 comprises: UDR SCP 433, mMTC UDR 443, URLLC UDR 444, internet-access (INET) UDR 445, Unified Data Management (UDM) 451, Network Exposure Function (NEF) 452, Policy Control Function (PCF) 453, Access and Mobility Management Function (AMF) 454, Authentication and Security Function (AUSF) 455, Session Management Function (SMF) 456, Application Function (AF) 457, mMTC User Plane Function (UPF) 461, MVNO UPF 462, eMBB UPF 463, and Security Edge Protection Proxy (SEPP) 473. PLMN A data center 421 could be configured like PLMN C data center 423 but is simplified for clarity and comprises UDR SCP 431, eMBB UDR 441, and SEPP 471. PLMN B data center 422 could be configured like PLMN C data center 423 but is simplified for clarity and comprises UDR SCP 432, MVNO UDR 442, and SEPP 472. 5G wireless communication network 400 is also simplified for clarity and typically comprises more UEs, ANs, data centers, PLMNs, slices, and network functions than shown.

UE 407 wirelessly attaches to 5GNR AN 413 and registers with AMF 454. UE 407 reports a Subscriber Concealed Identifier (SUCI) and an mMTC slice capability. AMF 454 interacts with AUSF 455 to authenticate UE 407 for an mMTC slice. AUSF 455 interacts with UDM 451 to authenticate UE 407 for the mMTC slice. UDM 451 interacts with UDR SCP 433 to authenticate UE 407 for the mMTC slice. UDR SCP 433 selects mMTC UDR 443 to authenticate UE 407 for the mMTC slice. In some examples, multiple mMTC UDRs are available and segmented by UR ID range, and UDR SCP 433 selects mMTC UDR 443 based on the SUCI or group ID for UE 407. UDR SCP 433 interacts with mMTC UDR 443 to authenticate UE 407 for the mMTC slice. In particular, mMTC UDR 443 serves a Subscriber Permanent Identifier (SUPI) for UE 407 and secret identity key for UE 407 to UDM 451 over UDR SCP 433. UDM 451 hashes a random number and the secret identity key into an expected result and transfers the random number, expected result, and SUPI for UE 407 to AUSF 455. AUSF 455 transfers the random number and expected result to AMF 454. AMF 454 transfers the random number to UE 407 over 5GNR AN 413. UE 407 hashes the random number with its own copy of the secret identity key into the same expected result and transfers the expected result to AMF 454. AMF 454 authenticates UE 407 by matching the expected results and then retrieves the SUPI for UE 407 from AUSF 455.

AMF 454 interacts with UDM 451 to obtain information for UE 407 for the mMTC slice. UDM 451 interacts with UDR SCP 433 to obtain the UE information for the mMTC slice. UDR SCP 433 selects mMTC UDR 443 to obtain the UE information for the mMTC slice. In some examples, multiple mMTC UDRs are available and UDR SCP 433 selects mMTC UDR 443 based on the SUPI or group ID for UE 407. UDR SCP 433 interacts with mMTC UDR 443 to obtain the UE information for the mMTC slice. In particular, mMTC UDR 443 serves UE subscriber data for UE 407 to UDM 451 over UDR SCP 433. UDM 451 serves the UE subscriber data for UE 407 to AMF 451.

AMF 454 interacts with PCF 453 to obtain policy for UE 407 for the mMTC slice. UDM 451 interacts with UDR SCP 433 to obtain the UE policy for the mMTC slice. UDR SCP 433 selects mMTC UDR 443 to obtain the UE policy for the mMTC slice. In some examples, multiple mMTC UDRs are available and UDR SCP 433 selects mMTC UDR 443 based on the SUPI or group ID for UE 407. UDR SCP 433 interacts with mMTC UDR 443 to obtain the UE policy for the mMTC slice. In particular, mMTC UDR 443 serves UE quality-of-service criteria and roaming rules for UE 407 to PCF 453 over UDR SCP 433. PCF 453 serves the UE policy data for UE 407 and the mMTC slice to AMF 451.

AMF 451 develops UE context for the mMTC slice for UE 407 based on the UE subscriber and policy data. AMF 451 signals the UE context for the mMTC slice for UE 407 to SMF 456. AMF 451 signals the UE context for the mMTC slice for UE 407 to 5GNR AN 413. AMF 451 signals the UE context for the mMTC slice to UE 407 over 5GNR AN 413. SMF 456 drives mMTC UPF 461 to serve UE 407 per the UE context for the mMTC slice. UE 407 and external systems exchange user data over 5GNR AN 413 and mMTC UPF 461 per the UE context for the mMTC slice.

Another UE 404 wirelessly attaches to 5GNR AN 412 and registers with AMF 454. UE 404 reports a SUCI and an eMBB slice capability. AMF 454 interacts with AUSF 455 to authenticate UE 404 for the eMBB slice. AUSF 455 interacts with UDM 451 to authenticate UE 404 for the eMBB slice. UDM 451 interacts with UDR SCP 433 to authenticate UE 404 for the eMBB slice. UDR SCP 433 selects eMBB UDR 441 to authenticate UE 404 for the eMBB slice. In some examples, multiple eMBB UDRs are available and UDR SCP 433 selects eMBB UDR 441 based on the SUCI or group ID for UE 404. UDR SCP 433 interacts with eMBB UDR 441 over SEPPs 471 and 473 to authenticate UE 407 for the eMBB slice. In particular, eMBB UDR 441 serves a SUPI and secret identity key for UE 404 to UDM 451 over SEPPs 471 and 473 and UDR SCP 433. UDM 451 hashes the random number and the secret identity key into an expected result and transfers the random number, expected result, and SUPI for UE 407 to AUSF 455. AUSF 455 transfers the random number and expected result to AMF 454. AMF 454 transfers the random number to UE 404 over 5GNR AN 412. UE 404 hashes the random number with its own copy of the secret identity key into the same expected result and transfers the expected result to AMF 454. AMF 454 authenticates UE 404 by matching the expected results and then retrieves the SUPI for UE 404 from AUSF 455.

AMF 454 interacts with UDM 451 to obtain information for UE 404 for the eMBB slice. UDM 451 interacts with UDR SCP 433 to obtain the UE information for the eMBB slice. UDR SCP 433 selects eMBB UDR 441 to obtain the UE information for the eMBB slice. In some examples, multiple eMBB UDRs are available and UDR SCP 433 selects eMBB UDR 441 based on the SUPI or group ID for UE 404. UDR SCP 433 interacts with eMBB UDR 443 to obtain the UE information for the eMBB slice. In particular, eMBB UDR 441 serves UE subscriber data for the SUPI for UE 404 to UDM 451 over UDR SCP 433 and SEPs 471 and 473. UDM 451 serves the UE subscriber data for UE 404 to AMF 454.

AMF 454 interacts with PCF 453 to obtain policy for UE 404 for the eMBB slice. UDM 451 interacts with UDR SCP 433 to obtain the UE policy for the eMBB slice. UDR SCP 433 selects eMBB UDR 441 to obtain the UE policy for the eMBB slice. In some examples, multiple eMBB UDRs are available and UDR SCP 433 selects eMBB UDR 441 based on the SUPI or group ID for UE 404. UDR SCP 433 interacts with eMBB UDR 441 to obtain the UE policy for the eMBB slice over SEPPs 471 and 473. In particular, eMBB UDR 441 serves UE quality-of-service criteria and roaming rules for the SUPI for UE 404 to PCF 453 over UDR SCP 433 and SEPPs 471 and 473. PCF 453 serves the UE policy data for UE 404 and the eMBB slice to AMF 451.

AMF 451 develops UE context for the eMBB slice for UE 404 based on the UE subscriber and policy data. AMF 451 signals the UE context for the eMBB slice for UE 404 to SMF 456. AMF 451 signals the UE context for the eMBB slice for UE 404 to 5GNR AN 412. AMF 451 signals the UE context for the mMTC slice for UE 404 to UE 404 over 5GNR AN 414. SMF 456 drives eMBB UPF 463 to serve UE 404 per the UE context for the eMBB slice. UE 404 and external systems exchange user data over 5GNR AN 412 and eMBB UPF 463 per the UE context for the eMBB slice.

UE 401 wirelessly attaches to 5GNR AN 411 and registers with AMF 454. UE 401 reports a SUCI and MVNO slice capability. The same authentication process is used as above with UDR SCP 433 selecting and using MVNO UDR 442 over SEPPs 471-472 based on the SUCI and MVNO capability of UE 401. UDM 451 and PCF 453 obtain UE subscription and policy data, and AMF 454 determines UE context for UE 401 over the MVNO slice. MVNO UPF 462 serves UE 401 over 5GNR AN 411 for the MVNO slice.

AF 457 interacts with an external MVNO application server (not shown for clarity) to receive a packet flow instruction for UE 401. AF 457 calls an Application Programming Interface (API) for the packet flow instruction for UE 401 on NEF 452. NEF 452 exposes the packet flow instruction for UE 401 to UDR SCP 433 for UDR delivery. UDR SCP 433 selects MVNO UDR 442 for the packet flow instruction for the MVNO slice for UE 401. In some examples, multiple MVNO UDRs are available and UDR SCP 433 selects MVNO UDR 442 based on the SUPI or group ID for UE 401. UDR SCP 433 interacts with MVNO UDR 442 over SEPPs 471-472 to transfer the packet flow instruction. MVNO UDR 442 transfers the packet flow instruction to serving PCF 453 over SEPPs 471-472 and UDR SCP 433. PCF 453 directs SMF 456 to modify the UE bearer, and SMF 456 drives MVNO UPF 462 based on the packet flow instruction. For example, UE 401 may receive a large data rate boost based on an MVNO promotion.

Figure 5:
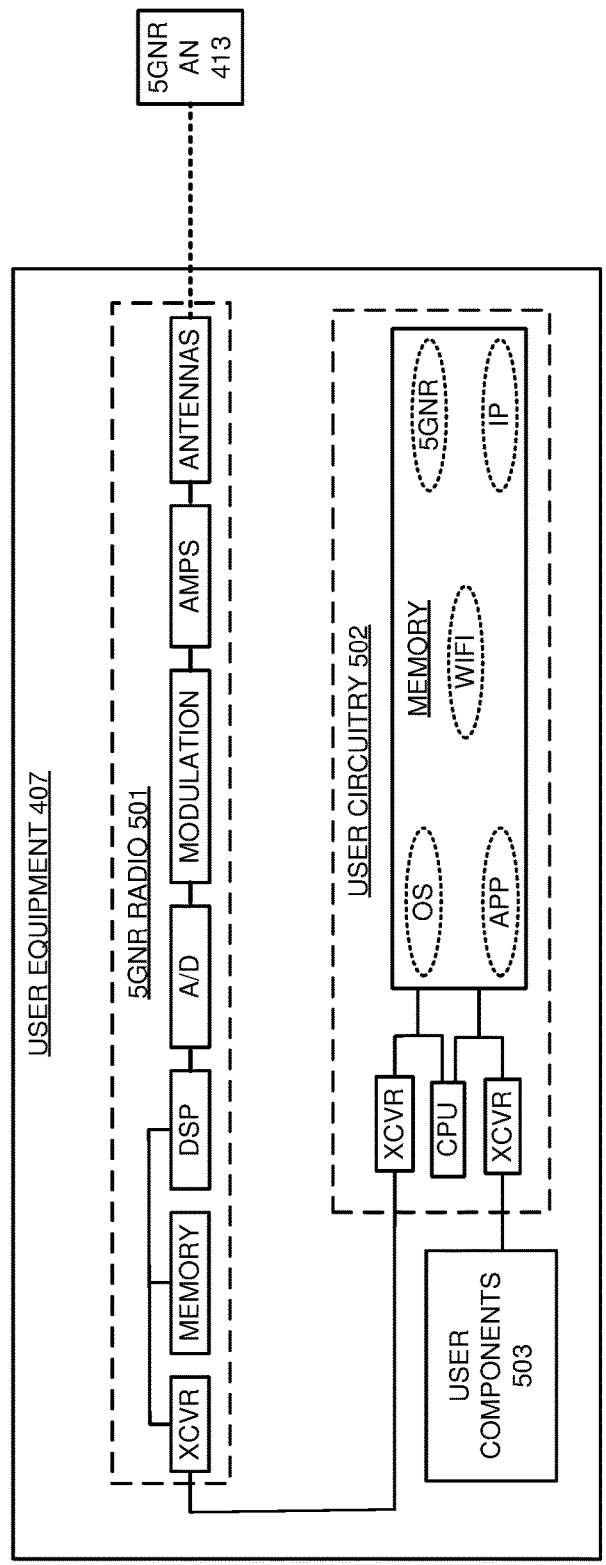
FIG. 5 illustrates the exemplary UE in the 5G wireless communication system.

FIG. 5 illustrates exemplary UE 407 in 5G wireless communication system 400. UE 407 comprises an example of UEs 101-103 and 401-406, although these UEs may differ. UE 407 comprises 5GNR radio 501, user circuitry 502, and user components 503. User components 503 comprise sensors, controllers, displays, or some other user apparatus. Radio 501 comprises antennas, amplifiers, filters, modulation, analog-to-digital interfaces, DSP, memory, and transceivers that are coupled over bus circuitry. User circuitry 503 comprises memory, CPU, user interfaces and components, and transceivers that are coupled over bus circuitry. The memory in user circuitry 503 stores an operating system (OS), user applications (APP), and network applications for WIFI, 5GNR, and IP. The antennas in 5GNR radio 501 are wirelessly coupled to 5GNR AN 413 over a 5GNR link A transceivers (XCVR) in radio 501 is coupled to a transceiver in user circuitry 502. A transceiver in user circuitry 502 is coupled to user components 503. The CPU in user circuitry 502 executes the operating system, user applications, and network applications to exchange network signaling and user data with 5GNR AN 413.

Figure 6:
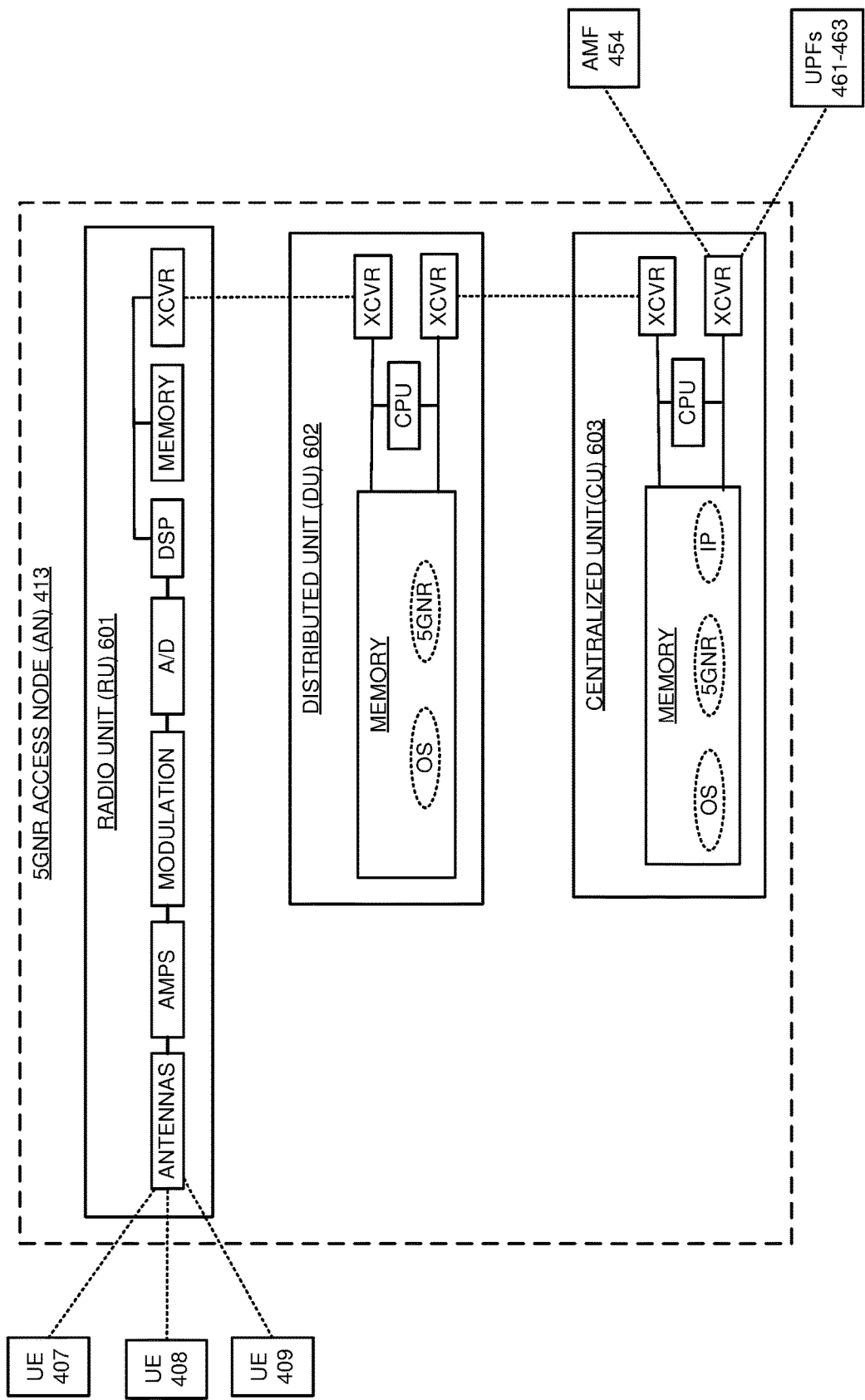
FIG. 6 illustrates an exemplary 5G New Radio (5GNR) Access Node (AN) in the 5G wireless communication system.

FIG. 6 illustrates exemplary 5G New Radio (NR) Access Node (AN) 413 in 5G wireless communication system 400. 5GNR AN 413 comprises an example of wireless access nodes 111-113 and 411-412, although access nodes 111-113 and 411-412 may differ. 5GNR AN 413 comprises Radio Unit (RU) 601, Distributed Unit (DU) 602, and Centralized Unit (CU) 603. RU 601 comprises 5GNR antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores an operating system and 5GNR network applications (Physical Layer, Media Access Control, Radio Link Control). CU 603 comprises memory, CPU, user interfaces and components, and transceivers that are coupled over bus circuitry. The memory in CU 603 stores an operating system, IP, and 5GNR network applications (Packet Data Convergence Protocol, Service Data Adaptation Protocol, Radio Resource Control). The antennas in RU 601 are wirelessly coupled to UE 401 over a 5GNR link Transceivers in RU 601 are coupled to transceivers in DU 602. Transceivers in DU 602 are coupled to transceivers in CU 603. Transceivers in CU 603 are coupled to AMF 421 and UPF 427. The DSP and CPU in RU 601, DU 602, and CU 603 execute operating systems, radio applications, and 5GNR applications to exchange network signaling and user data with UEs 407-409, AMF 454, and UPFs 461-463.

Figure 7:
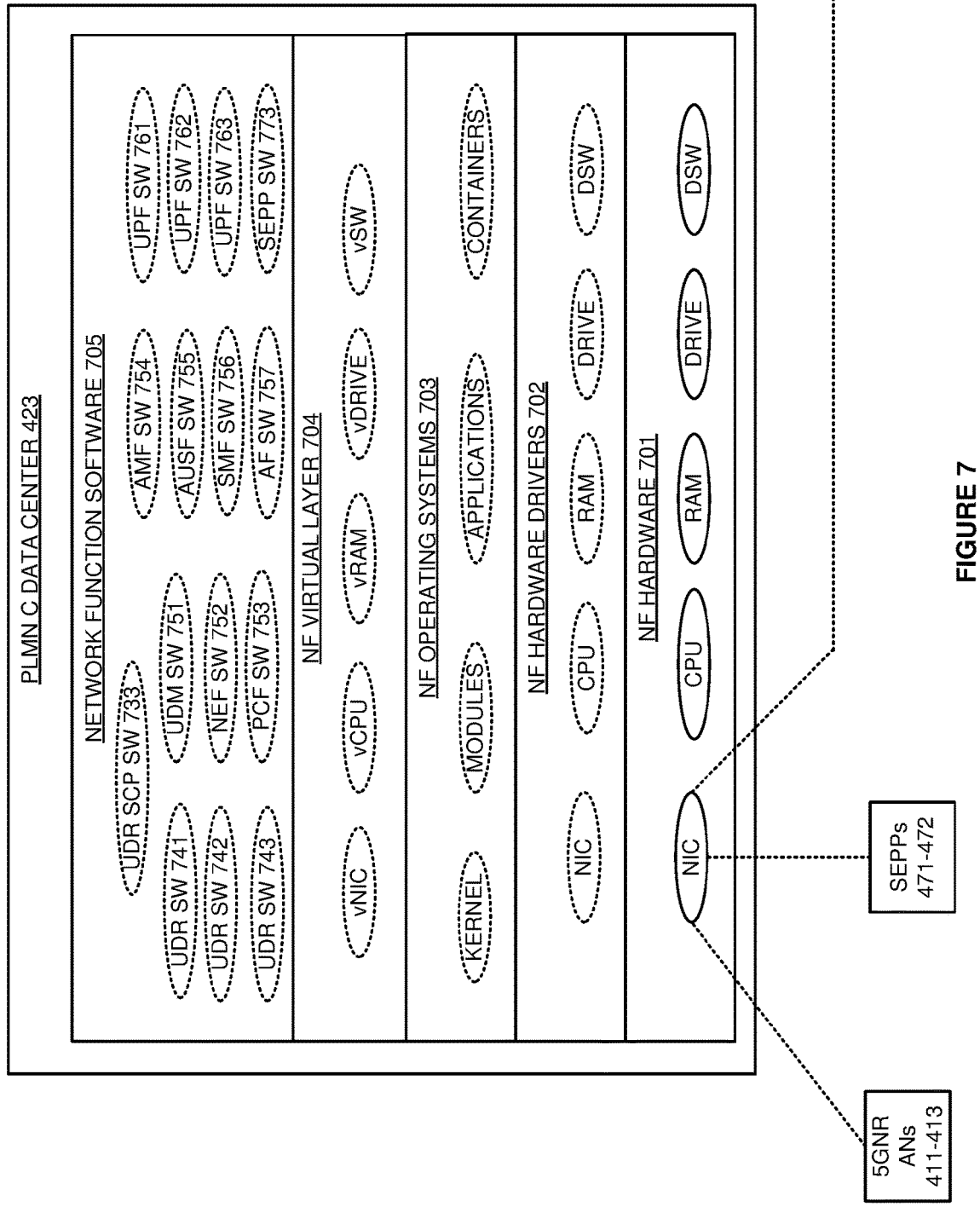
FIG. 7 illustrates an exemplary data center in the 5G wireless communication system.

FIG. 7 illustrates exemplary PLMN C data center 423 in 5G wireless communication system 400. Data center 423 comprises an example of network elements 131-133, SCPs 141-143, UDRs 151-153, and data centers 421-422, although these elements may differ. Data center 423 comprises Network Function (NF) hardware 701, NF hardware drivers 702, NF operating systems 703, NF virtual layer 704, and NF Software (SW) 705. NF hardware 701 comprises Network Interface Cards (NICs), CPU, RAM, Flash/Disk Drives (DRIVE), and Data Switches (DSW). NF hardware drivers 702 comprise software that is resident in the NIC, CPU, RAM, DRIVE, and DSW. NF operating systems 703 comprise kernels, modules, and applications that form containers for virtual layer and NF software execution. NF virtual layer 704 comprises vNIC, vCPU, vRAM, vDRIVE, and vSW. NF SW 705 comprises UDR SCP SW 733, UDR SW 741-743, UDM SW 751, NEF SW 752, PCF SW 753, AMF SW 754, AUSF SW 755, SMF SW 756, AF SW 757, UPF SW 761-763, and SEPP SW 773. Other NFs like Network Repository Function (NRF) are typically present but are omitted for clarity. Data center 420 may be located at a single site or be distributed across multiple geographic locations. The NIC in NF hardware 701 are coupled to 5GNR ANs 411-413, SEPPs 471-472, and external systems. NF hardware 701 executes NF hardware drivers 702, NF operating systems 703, NF virtual layer 704, and NF SW 705 to form and operate UDR SCP 433, UDRs 441-443, UDM 451, NEF 452, PCF 453, AMF 454, AUSF 455, SMF 456, AF 457, UPFs 461-463, and SEPP 473.

Figure 8:
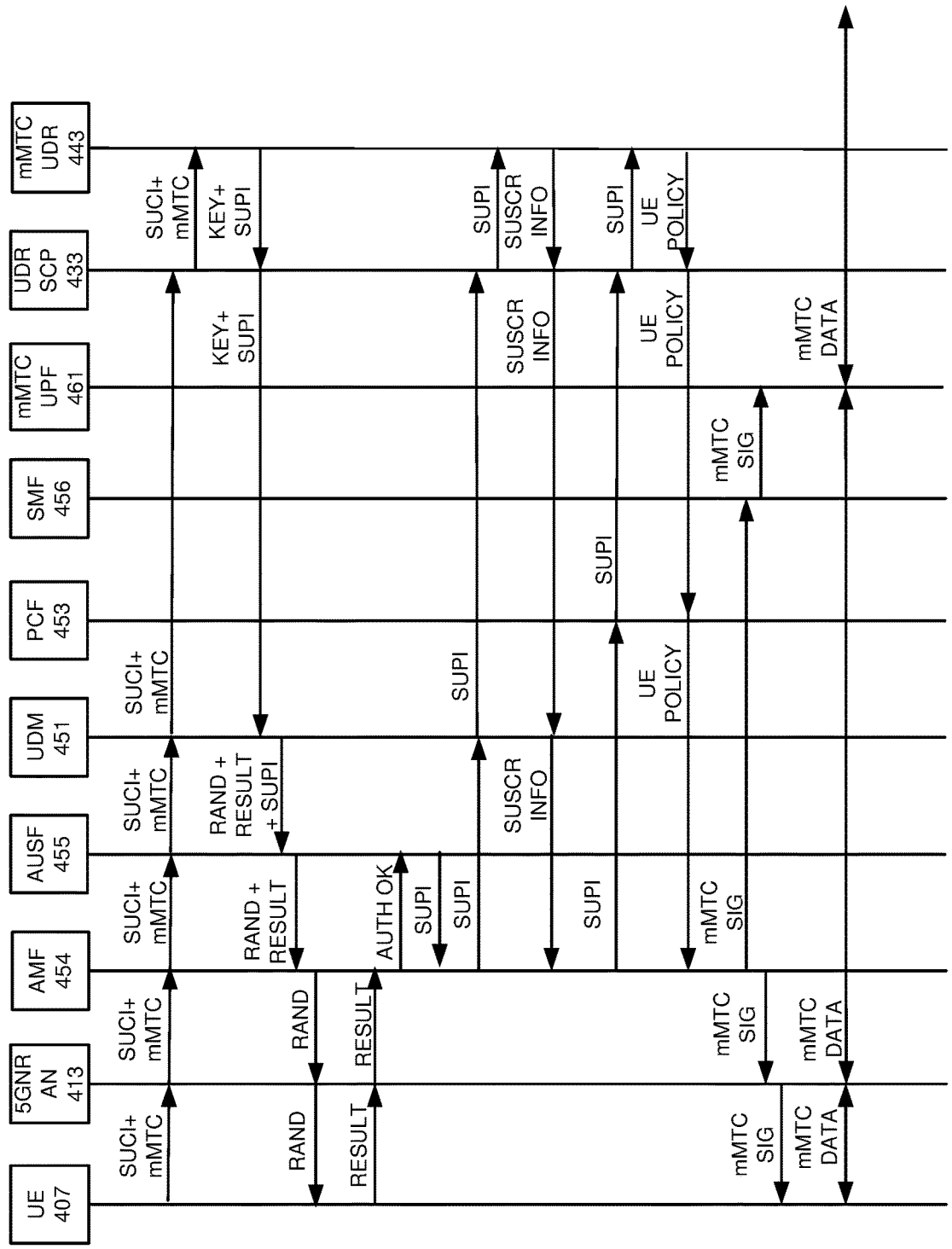
FIG. 8 illustrates an exemplary operation of the 5G wireless communication network that comprises the multiple PLMNs to use the UDRs to serve the wireless UEs over the wireless network slices.

FIG. 8 illustrates an exemplary operation of 5G wireless communication system 400 that comprises PLMNs A, B, and C to use UDRs 441-445 to serve wireless UEs 401-407 over the wireless network slices. The operation may vary in other examples. UE 407 wirelessly transfers its SUCI and mMTC slice capability to 5GNR AN 413 which transfers the SUCI and mMTC slice capability to AMF 454. AMF 454 transfers the SUCI and mMTC slice capability to AUSF 455 for authentication. AUSF 455 transfers the SUCI and mMTC slice capability for UE 407 to UDM 451 for authentication. UDM 451 transfers the SUCI and mMTC slice capability for UE 407 to UDR SCP 433 for authentication. UDR SCP 433 selects mMTC UDR 443 based on the mMTC slice and SUCI. UDR SCP 433 transfers the SUCI and mMTC slice capability for UE 407 to UDR 443 for authentication. mMTC UDR 443 serves a Subscriber Permanent Identifier (SUPI) and secret identity key for UE 407 to UDM 451 over UDR SCP 433. UDM 451 hashes a random number and the secret identity key into an expected result and transfers the random number, expected result, and SUPI for UE 407 to AUSF 455. AUSF 455 transfers the random number and expected result to AMF 454. AMF 454 transfers the random number to UE 407 over 5GNR AN 413. UE 407 hashes the random number with its own copy of the secret identity key into the same expected result and transfers the expected result to AMF 454 over 5GNR AN 413. AMF 454 authenticates UE 407 by matching the expected results and then retrieves the SUPI for UE 407 from AUSF 455. AMF 454 transfers the SUPI for UE 407 to UDM 451 to obtain UE subscriber information for the mMTC slice. UDM 451 transfers the SUPI for UE 407 to UDR SCP 433 to obtain the subscriber information for the mMTC slice. UDR SCP 433 selects mMTC UDR 443 to obtain subscriber information for the mMTC slice. UDR SCP 433 transfers the SUPI for UE 407 to mMTC UDR 443 to obtain the subscriber information for the mMTC slice. mMTC UDR 443 serves the subscriber information for the SUPI for UE 407 to UDM 451 over UDR SCP 433. UDM 451 serves the subscriber data for UE 407 to AMF 454. AMF 454 transfers the SUPI for UE 407 to PCF 453 to obtain policy for the mMTC slice. PCF 453 transfers the SUPI for UE 407 to UDR SCP 433 to obtain policy for the mMTC slice. UDR SCP 433 selects mMTC UDR 443 to obtain the UE policy for the mMTC slice. UDR SCP 433 transfers the SUPI for UE 407 to mMTC UDR 443 to obtain policy for the mMTC slice. mMTC UDR 443 serves UE quality-of-service criteria and roaming rules for the SUPI for UE 407 to PCF 453 over UDR SCP 433. PCF 453 serves the UE policy data for UE 407 and the mMTC slice to AMF 451. AMF 451 develops UE context for the mMTC slice for UE 407 based on the UE subscriber and policy data. AMF 451 signals (mMTC SIG) the UE context for the mMTC slice for UE 407 to SMF 456. SMF 456 signals mMTC UPF 461 to serve UE 407 per the UE context for the mMTC slice. AMF 451 signals the UE context for the mMTC slice for UE 407 to 5GNR AN 413 which forwards the UE context for the mMTC slice to UE 407. UE 407 and external systems exchange mMTC data over 5GNR AN 413 and mMTC UPF 461 per the UE context for the mMTC slice.

Figure 9:
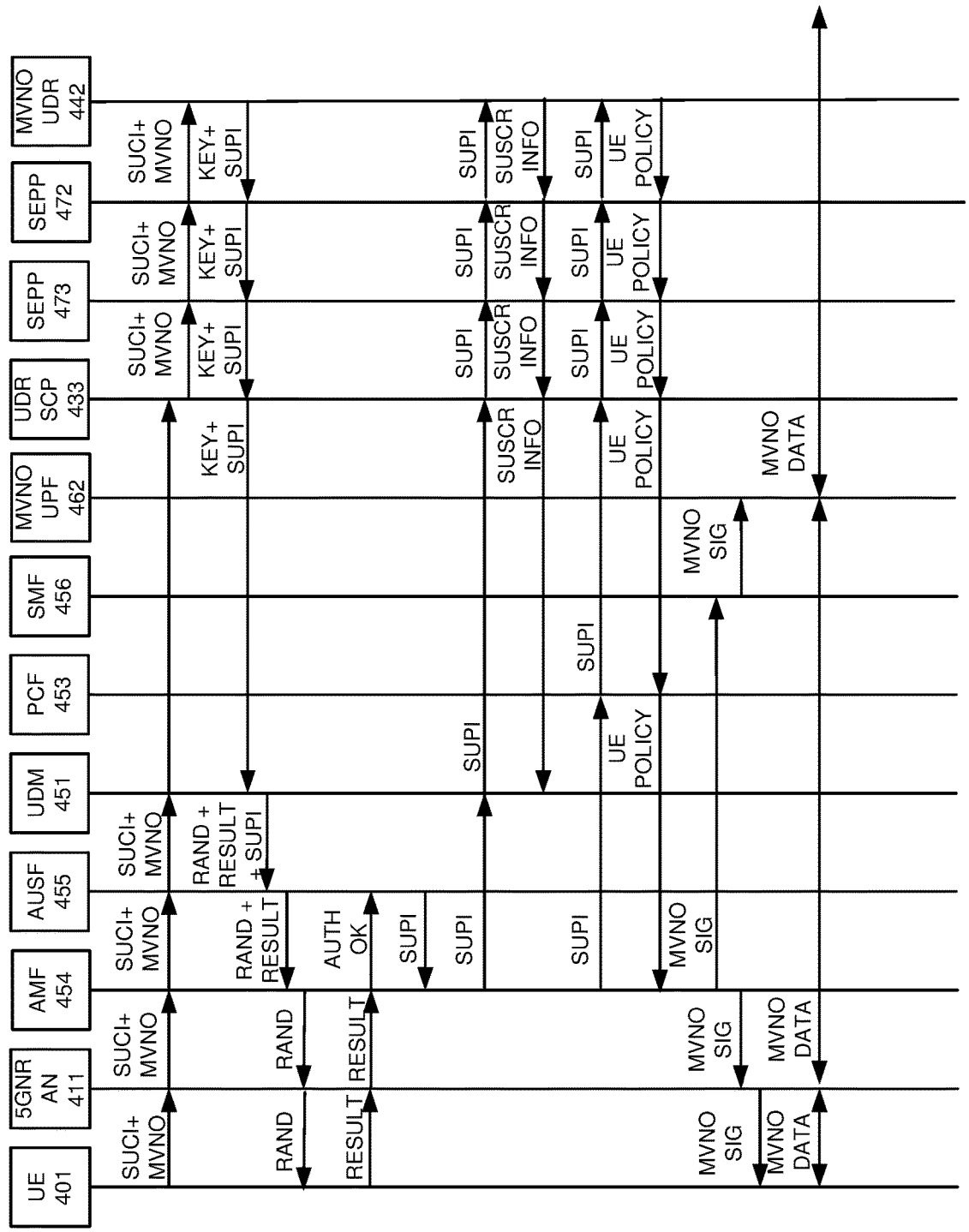
FIG. 9 illustrates an exemplary operation of the 5G wireless communication network that comprises the multiple PLMNs to use the UDRs to serve the wireless UEs over the wireless network slices.

FIG. 9 illustrates an exemplary operation of the 5G wireless communication system 400 that comprises PLMNs A, B, and C to use UDRs 441-445 to serve wireless UEs 401-407 over the wireless network slices. The operation may vary in other examples. UE 401 wirelessly transfers its SUCI and MVNO slice capability to 5GNR AN 411 which transfers the SUCI and MVNO slice capability to AMF 454. AMF 454 transfers the SUCI and MVNO slice capability to AUSF 455 for authentication. AUSF 455 transfers the SUCI and MVNO slice capability for UE 407 to UDM 451 for authentication. UDM 451 transfers the SUCI and MVNO slice capability for UE 401 to UDR SCP 433 for authentication. UDR SCP 433 selects MVNO UDR 442 based on the MVNO slice and SUCI. UDR SCP 433 transfers the SUCI and MVNO slice capability for UE 401 to UDR 442 for authentication over SEPPs 472-473. MVNO UDR 442 serves a Subscriber Permanent Identifier (SUPI) and secret identity key for UE 401 to UDM 451 over UDR SCP 433. UDM 451 hashes a random number and the secret identity key into an expected result and transfers the random number, expected result, and SUPI for UE 401 to AUSF 455. AUSF 455 transfers the random number and expected result to AMF 454. AMF 454 transfers the random number to UE 401 over 5GNR AN 411. UE 401 hashes the random number with its own copy of the secret identity key into the same expected result and transfers the expected result to AMF 454 over 5GNR AN 411. AMF 454 authenticates UE 401 by matching the expected results and then retrieves the SUPI for UE 401 from AUSF 455. AMF 454 transfers the SUPI for UE 401 to UDM 451 to obtain UE subscriber information for the MVNO slice. UDM 451 transfers the SUPI for UE 401 to UDR SCP 433 to obtain the subscriber information for the MVNO slice. UDR SCP 433 selects MVNO UDR 442 to obtain the subscriber information for the MVNO slice. UDR SCP 433 transfers the SUPI for UE 401 to MVNO UDR 443 to obtain the subscriber information for the MVNO slice. MVNO UDR 442 serves the subscriber information for the SUPI for UE 401 to UDM 451 over UDR SCP 433 and SEPPs 472-473. UDM 451 serves the subscriber data for UE 401 to AMF 454. AMF 454 transfers the SUPI for UE 401 to PCF 453 to obtain policy for the MVNO slice. PCF 453 transfers the SUPI for UE 407 to UDR SCP 433 to obtain policy for the MVNO slice. UDR SCP 433 selects MVNO UDR 442 to obtain the UE policy for the MVNO slice. UDR SCP 433 transfers the SUPI for UE 401 to MVNO UDR 443 to obtain policy for the MVNO slice. MVNO UDR 442 serves UE quality-of-service criteria and roaming rules for the SUPI for UE 401 to PCF 453 over UDR SCP 433 and SEPPs 472-473. PCF 453 serves the UE policy data for UE 401 and the MVNO slice to AMF 451. AMF 451 develops UE context for the MVNO slice for UE 401 based on the UE subscriber and policy data. AMF 451 signals (MVNO SIG) the UE context for the MVNO slice for UE 401 to SMF 456. SMF 456 signals MVNO UPF 462 to serve UE 401 per the UE context for the MVNO slice. AMF 451 signals the UE context for the MVNO slice for UE 401 to 5GNR AN 411 which forwards the UE context for the mMTC slice to UE 401. UE 401 and external systems exchange MVNO data over 5GNR AN 411 and MVNO UPF 462 per the UE context for the MVNO slice.

The wireless data network circuitry described above comprises computer hardware and software that form special-purpose PLMN circuitry to use UDRs to serve wireless UEs over wireless network slices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose PLMN circuitry to use UDRs to serve wireless UEs over wireless network slices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to serve a wireless User Equipment (UE) over a wireless network slice, the method comprising:
   a serving wireless communication network selecting a Uniform Data Repository (UDR) in a target wireless communication network based on the wireless network slice and transferring an information request for the wireless UE across a wireless communication network boundary to the selected UDR in the target wireless communication network;
   the selected UDR in the target wireless communication network receiving the information request for the wireless UE across the wireless communication network boundary from the serving wireless communication network, and in response to the information request, transferring UE information for the wireless UE across the wireless communication network boundary to the serving wireless communication network;
   the serving wireless communication network receiving the UE information for the wireless UE across the wireless communication network boundary from the target wireless communication network; and the wireless network slice in the serving wireless communication network serving the wireless UE based on the UE information.

2. The method of claim 1 wherein:

the serving wireless communication network comprises a serving Public Land Mobile Network (PLMN); and the target wireless communication network comprises a target PLMN.

3. The method of claim 1 wherein the serving wireless communication network selecting the selected UDR in the target wireless communication network based on the wireless network slice and transferring the information request for the wireless UE across the wireless communication network boundary to the selected UDR in the target wireless communication network comprises a Service Communication Proxy (SCP) selecting the selected UDR in the target wireless communication network based on the wireless network slice and transferring the information request for the wireless UE across the wireless communication network boundary to the selected UDR in the target wireless communication network.

4. The method of claim 1 wherein the wireless network slice comprises a Mobile Virtual Network Operator (MVNO) slice.

5. The method of claim 1 wherein the wireless network slice comprises a mobile internet-access slice.

6. The method of claim 1 wherein the wireless network slice comprises a massive Machine Type Communications (mMTC) slice.

7. The method of claim 1 wherein the wireless network slice comprises an Ultra-Reliable Low-Latency Communication (URLLC) slice.

8. The method of claim 1 wherein the wireless network slice comprises an enhanced Mobile Broadband (eMBB) slice.

9. A method to serve a wireless User Equipment (UE) over a wireless network slice, the method comprising:

a Service Communication Proxy (SCP) in a serving Public Land Mobile Network (PLMN) selecting a Uniform Data Repository (UDR) in a target PLMN;

the SCP transferring an information request for the wireless UE to the selected UDR in the target PLMN;

the selected UDR in the target PLMN receiving the information request for the wireless UE from the SCP in the serving PLMN, and in response to the information request, transferring UE information for the wireless UE to the serving PLMN; and the wireless network slice in the serving PLMN serving the wireless UE based on the UE information from the selected UDR in the target PLMN.

10. The method of claim 9 wherein the UE information comprises a Subscriber Permanent Identifier (SUPI) for the wireless UE.

11. The method of claim 9 wherein the UE information comprises an authentication key for the wireless UE.

12. The method of claim 9 wherein the UE information comprises a PLMN policy for the wireless UE.

13. A wireless communication system to serve a wireless User Equipment (UE) over a wireless network slice, the wireless communication system comprising:

a serving wireless communication network to select a Uniform Data Repository (UDR) in a target wireless communication network based on the wireless network slice and transfer an information request for the wireless UE across a wireless communication network boundary to the selected UDR in the target wireless communication network;

the selected UDR in the target wireless communication network to receive the information request for the wireless UE across the wireless communication network boundary from the serving wireless communication network, and in response to the information request, transfer UE information for the wireless UE across the wireless communication network boundary to the serving wireless communication network; and the wireless network slice in the serving wireless communication network to serve the wireless UE based on the UE information.

14. The wireless communication system of claim 13 wherein:

the serving wireless communication network comprises a serving Public Land Mobile Network (PLMN); and the target wireless communication network comprises a target PLMN.

15. The wireless communication system of claim 13 wherein a Service Communication Proxy (SCP) in the serving wireless communication network is to select the selected UDR in the target wireless communication network and transfer the information request for the wireless UE across the wireless communication network boundary to the selected UDR in the target wireless communication network.

16. The wireless communication system of claim 13 wherein the wireless network slice comprises a massive Machine Type Communications (mMTC) slice.

17. The wireless communication system of claim 13 wherein the wireless network slice comprises an Ultra-Reliable Low-Latency Communication (URLLC) slice.

18. The wireless communication system of claim 13 wherein the wireless network slice comprises one of an enhanced Mobile Broadband (eMBB) slice.

19. The wireless communication system of claim 13 wherein the wireless network slice comprises one of a Mobile Virtual Network Operator (MVNO) slice.

20. The wireless communication system of claim 13 wherein the UE information comprises at least one of a Subscriber Permanent Identifier (SUPI) for the wireless UE, an authentication key for the wireless UE, and a network policy for the wireless UE.

* * * * *